(12) United States Patent
Rosenberg et al.

(10) Patent No.: US 11,242,026 B2
(45) Date of Patent: Feb. 8, 2022

(54) TECHNIQUES FOR DEPLOYING VEHICLE AIRBAG SYSTEMS WITH PRIMARY AND AUXILIARY AIRBAGS

(71) Applicant: Volvo Car Corporation, Gothenburg (SE)

(72) Inventors: Johan Rosenberg, Lerum (SE); Sebastian Rutelin, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 79 days.

(21) Appl. No.: 16/537,758

(22) Filed: Aug. 12, 2019

(65) Prior Publication Data

US 2021/0046893 A1    Feb. 18, 2021

(51) Int. Cl.

| | |
|---|---|
| *B60R 21/233* | (2006.01) |
| *B60R 21/263* | (2011.01) |
| *B60R 21/08* | (2006.01) |
| *B60R 21/013* | (2006.01) |
| *B60R 21/205* | (2011.01) |

(Continued)

(52) U.S. Cl.
CPC .......... *B60R 21/233* (2013.01); *B60R 21/013* (2013.01); *B60R 21/08* (2013.01); *B60R 21/203* (2013.01); *B60R 21/205* (2013.01); *B60R 21/263* (2013.01); *B60R 2021/01225* (2013.01); *B60R 2021/01231* (2013.01); *B60R 2021/23107* (2013.01); *B60R 2021/23324* (2013.01); *B60R 2021/2633* (2013.01)

(58) Field of Classification Search
CPC ................ B60R 21/203; B60R 21/205; B60R 2021/01231; B60R 2021/23107
See application file for complete search history.

(56) References Cited

U.S. PATENT DOCUMENTS 8,181,990 B2 *  5/2012  Maripudi ............ B60R 21/2338
                                                         280/743.2
9,108,584 B2    8/2015  Rao et al.
(Continued)

FOREIGN PATENT DOCUMENTS

DE        102007051281 A1 *  4/2009  ............. B60R 21/26
DE        102018001991 A1     9/2018
WO        WO-2019135861 A1 *  7/2019  ........... B60R 21/231

OTHER PUBLICATIONS

Machine language translation of DE102007051281A1, obtained from Espacenet.com on Apr. 6, 2021.*

*Primary Examiner* — Drew J Brown
(74) *Attorney, Agent, or Firm* — Clements Bernard Walker; Christopher L. Bernard (57) ABSTRACT

Airbag systems for use in a vehicle that is operable in a manual-steering mode or an automated-steering mode are provided. In one embodiment, an airbag system includes a primary airbag installed in a dashboard of a vehicle. The primary airbag is configured to be deployed when a collision event is detected, and, when deployed, the primary airbag is configured to protect a person seated in a driver seat of the vehicle. the airbag system also includes an auxiliary airbag configured to be deployed when the collision event is detected. During operation of the vehicle in a manual-steering mode, the deployment of the auxiliary airbag is configured to reduce contact between the primary airbag and a steering wheel of the vehicle when the primary airbag is deployed from the dashboard.

18 Claims, 6 Drawing Sheets

(51) Int. Cl.
    *B60R 21/203*       (2006.01)
    *B60R 21/231*       (2011.01)
    *B60R 21/01*         (2006.01)

(56) References Cited

U.S. PATENT DOCUMENTS

| | | |
|---|---|---|
| 9,758,121 B2 | 9/2017 | Paxton et al. |
| 9,963,035 B2 * | 5/2018 | El Aile .................. B60K 37/04 |
| 2004/0026909 A1 * | 2/2004 | Rensinghoff ......... B60R 21/231 |
| | | 280/732 |
| 2019/0135220 A1 * | 5/2019 | Rupp .................... B60R 21/237 |
| 2019/0161044 A1 * | 5/2019 | Schneider ............. B60R 21/203 |
| 2019/0381962 A1 * | 12/2019 | Sheldon ................ B62D 1/183 |
| 2020/0001815 A1 * | 1/2020 | Minakawa ............ B60R 21/203 |

\* cited by examiner

TECHNIQUES FOR DEPLOYING VEHICLE AIRBAG SYSTEMS WITH PRIMARY AND AUXILIARY AIRBAGS

TECHNICAL FIELD

The present disclosure is generally directed to the automotive and vehicle safety fields. More particularly, the present disclosure relates to techniques for deploying vehicle airbag systems with primary and auxiliary airbags during a collision event.

BACKGROUND

For many years, airbags have been an essential part of the safety systems of vehicles. A typical airbag system may include a detector mechanism for detecting when a vehicle experiences a collision event, such as a front-end collision, for example. Once a collision event is detected, the typical airbag system will usually deploy at least one airbag, such as a driver-side airbag to protect the driver from forceful contact with the steering wheel, dashboard, and windshield. This driver-side airbag is usually deployed from a center section of the steering wheel toward the driver. Also, if the system determines that a passenger is seated in the front passenger seat, a second airbag may be deployed from the dashboard to protect this passenger as well. Thus, the needed airbags are deployed, as deemed required to protect the vehicle occupant(s) based on the determined crash severity and other parameters.

Referring now to another aspect of vehicles, it has been predicted that most or all vehicles in the future will be operated automatically without human control. Automated control may include both speed control as well as steering/directional control. At that time in the future when most vehicles will be autonomous-driving (AD) vehicles, the steering wheel will no longer be needed. Without steering wheels, airbag systems will no longer have a "driver-side" airbag that is deployed from a steering wheel, but instead may have only "passenger" airbags, which may deploy from both sides of the dashboard. Thus, it is likely that all airbag systems in the future will be passenger-type airbags.

In the meantime, however, the design of vehicles must include a transitional stage, transitioning from a fully manual mode as is typically used today where the conventional steering wheel is in a fixed position, to a fully automated mode in which vehicles will have no steering wheels at all. Current vehicles may therefore be designed for use during this transitional stage such that a steering wheel can be used in a manual-steering mode or may be used sparingly or not at all in an automated-steering or semi-automated mode. Some vehicles may include a steering wheel that can be moved out of the way, such as one that can be folded into or slid into the dashboard, removed from the steering column, or otherwise displaced from the conventional manual steering position. In these transitional vehicles, the steering wheel can therefore be arranged in different positions based on whether the vehicle is operated in a manual steering mode or an automated steering mode.

As a result of the various positions of the steering wheel, the conventional driver-side airbag that deploys from a steering wheel will not be able to work properly if the steering wheel is in a stowed or other location. Thus, in these vehicles, a driver airbag may instead be installed in the dashboard and may be configured to deploy over the top of the conventional steering wheel position. However, an airbag of such a system may operate differently based on whether there is a steering wheel that is present in the conventional position or whether it has been displaced. There is a possibility that an airbag deploying from the dashboard may contact the back or side of the edge of the steering wheel, which may cause the airbag to open improperly.

Therefore, there is a need in the field of vehicle safety systems to provide an airbag system that takes into account whether a steering wheel is present or absent on account of the vehicle being operated in either a manual-steering mode or an automated-steering mode and to deploy one or more airbags based on the steering wheel location. When a passenger-type airbag is deployed from the dashboard, an intervening steering wheel must be addressed.

SUMMARY

The present disclosure describes various embodiments of airbag systems, such as dual-airbag systems, which are configured for use in a vehicle that is operable in both a manual-steering mode and an automated-steering mode. In one embodiment of the present disclosure, an airbag system includes a primary airbag installed in a dashboard of the vehicle, whereby the primary airbag is configured to be deployed when a collision event is detected. The primary airbag, when deployed, is configured to protect a person seated in a driver seat of the vehicle. The airbag system further comprises an auxiliary airbag configured to be deployed when the collision event is detected. During operation of the vehicle in the manual-steering mode, the deployment of the auxiliary airbag is configured to reduce contact between the primary airbag and a steering wheel of the vehicle when the primary airbag is deployed from the dashboard.

According to another embodiment, a method of controlling an airbag system of a vehicle is provided. The method comprises the steps of determining if the vehicle is operating in a manual-steering mode or an automated-steering mode and detecting if the vehicle experiences a collision event. If a collision event is detected when the vehicle is operating in the manual-steering mode, the method includes the step of deploying a primary airbag from a dashboard of the vehicle to protect a person seated in a driver seat of the vehicle. However, before deploying the primary airbag, the method includes the step of deploying an auxiliary airbag to reduce contact between the primary airbag and a steering wheel when the primary airbag is deployed from the dashboard.

According to yet another embodiment, the present disclosure provides a vehicle operable in both a manual-steering mode and an automated-steering mode. The vehicle in this embodiment includes a dashboard and a steering wheel configured to be arranged in a first position for use in a manual-steering mode and configured to be displaced from the first position for use in an automated-steering mode. The vehicle also includes a driver seat configured to enable a driver to operate the steering wheel when the steering wheel is arranged in the first position for use in the manual steering mode. Furthermore, the vehicle includes a driver-side airbag system installed in the dashboard, where the driver-side airbag system includes a primary airbag and an auxiliary airbag. When a collision event is detected, the primary airbag is configured to be deployed for protecting a person seated in the driver seat and the auxiliary airbag is also configured to be deployed. During operation of the vehicle in the manual-steering mode, the deployment of the auxiliary airbag is configured to reduce contact between the primary airbag and the steering wheel when the primary airbag is deployed from the dashboard.

BRIEF DESCRIPTION OF THE DRAWINGS

The present disclosure is directed to various embodiments illustrated in the multiple figures and described in the detailed description with reference to the drawings. In the figures, like reference numbers are used to denote like system elements, components, and features and/or method steps. The illustrated elements and components of the various systems are not necessarily drawn to scale.

DESCRIPTION OF EMBODIMENTS

The present disclosure describes various embodiments of airbag systems, particularly airbag systems having airbag assemblies with at least two airbags that are deployed during a detected collision event for protection of a single person. A first airbag blocks a potentially obstruction-laden path for a second airbag such that the second airbag does not get caught up with the obstruction (i.e., the steering wheel) during deployment of the airbags. Thus, the first airbag can bridge the gap between the steering wheel and the dashboard or form a wedge that at least partially fills this gap, thereby creating an unobstructed path for the second airbag when being inflated.

Figure 1:
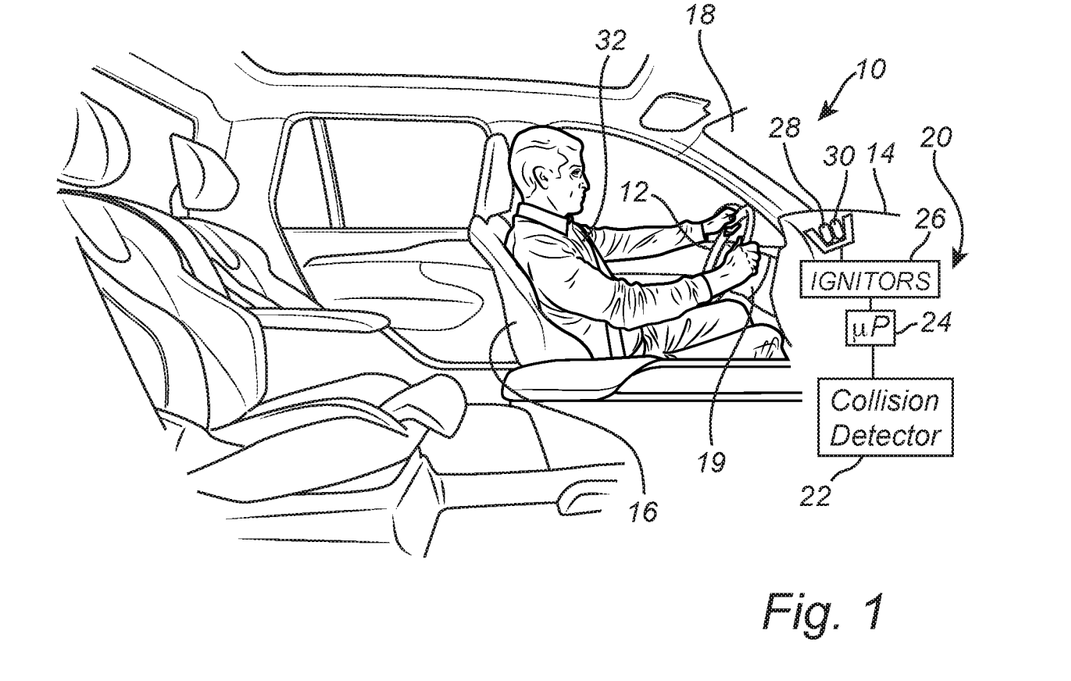
FIG. 1 is a schematic diagram illustrating a side view of an interior portion of a vehicle operable in both a manual-steering mode and an automated-steering mode, the vehicle including a dual-airbag system installed therein for protecting a person seated in a driver seat of the vehicle, according to various embodiments of the present disclosure.

FIG. 1 is a side view showing an embodiment of a vehicle 10 operable in both a manual-steering mode and an automated-steering mode. The vehicle 10 includes, among other things, a steering wheel 12, a dashboard 14, a driver seat 16, and a windshield 18. The driver seat 16 is a seat where a person driving the vehicle 10 in the manual-steering mode would sit. The steering wheel 12 may be connected to the dashboard 14 via a steering column 19. In the manual-steering mode, the steering wheel 12 may be arranged within the vehicle 10 in a normal steering position. However, in the automated-steering mode, the steering wheel 12 (and steering column 19) may be moved to a different location, such as within the dashboard 14, to a side position along the front of the dashboard 14, under the dashboard 14, removed from the dashboard 14 altogether, or in any other displaced position.

The vehicle 10 also includes a dual-airbag system 20 that is configured to protect a person 32 seated in the driver seat 16 of the vehicle 10. The dual-airbag system 20 may include, among other things, a collision detector 22, a microprocessor 24, one or more ignitors/inflators 26, and an airbag assembly. The airbag assembly may take many different forms as described below with respect to the many different embodiments. In particular, the airbag assembly may include at least two airbags, such as airbags 28 and 30. The first airbag 28 may be used as an auxiliary airbag for creating a path to allow the second airbag 30 (e.g., the primary airbag) to be deployed without interference from the steering wheel 12.

The ignitors/inflators 26 and airbags 28, 30 are installed in the dashboard 14. When stored in the dashboard 14, the airbags 28, 30 are deflated and may be rolled or folded to conserve space. When the collision detector 22 determines that the vehicle 10 has experiences a collision, such as a front-end collision, the microprocessor 24 sends a control signal to the ignitors/inflators 26 causing the ignitors/inflators 26 to quickly inflate the airbags 28, 30. The dual-airbag system 20, according to the present disclosure, is configured to deploy the airbags 28, 30 such that the airbags 28, 30 protect the person 32 seated in the driver seat 16 from forcefully contacting the steering wheel 12 (if present), the dashboard 16, and/or the windshield 18.

Therefore, according to some embodiments, the present disclosure is directed to a vehicle (e.g., vehicle 10) that is operable in both a manual-steering mode and an automated-steering mode. The vehicle 10 includes a dashboard (e.g., dashboard 14) and a steering wheel (e.g., steering wheel 12) that is configured to be arranged in a first position for use in a manual-steering mode and configured to be displaced from the first position for use in an automated-steering mode. The vehicle 10 also includes a driver seat (e.g., driver seat 16) that is configured to enable a driver (e.g., driver 32) to operate the steering wheel 12 when the steering wheel 12 is arranged in the first position for use in the manual steering mode.

In addition, the vehicle 10 includes a driver-side airbag system (e.g., airbag system 20) installed at least partially in the dashboard 14. The driver-side airbag system 20 includes a primary airbag (e.g., airbag 30), whereby, when a collision event is detected, the primary airbag 30 is configured to be deployed for protecting the person 32 seated in the driver seat 16. The driver-side airbag system 20 further includes an auxiliary airbag (e.g., airbag 28) configured to be deployed when the collision event is detected. During operation of the vehicle 10 in the manual-steering mode, the deployment of the auxiliary airbag 28 is configured to reduce contact between the primary airbag 30 and the steering wheel 12 when the primary airbag 30 is deployed from the dashboard 14.

Furthermore, the vehicle 10 is configured such that when the steering wheel 12 is displaced from the original first position for manual steering, the steering wheel 12 can be folded or retracted into the dashboard 14 or moved to a side position along the dashboard 14. The vehicle 10 may also include a separate passenger-side airbag system (not shown) installed in the dashboard 14 for protecting a passenger seated in the front passenger seat of the vehicle 10.

Figure 2:
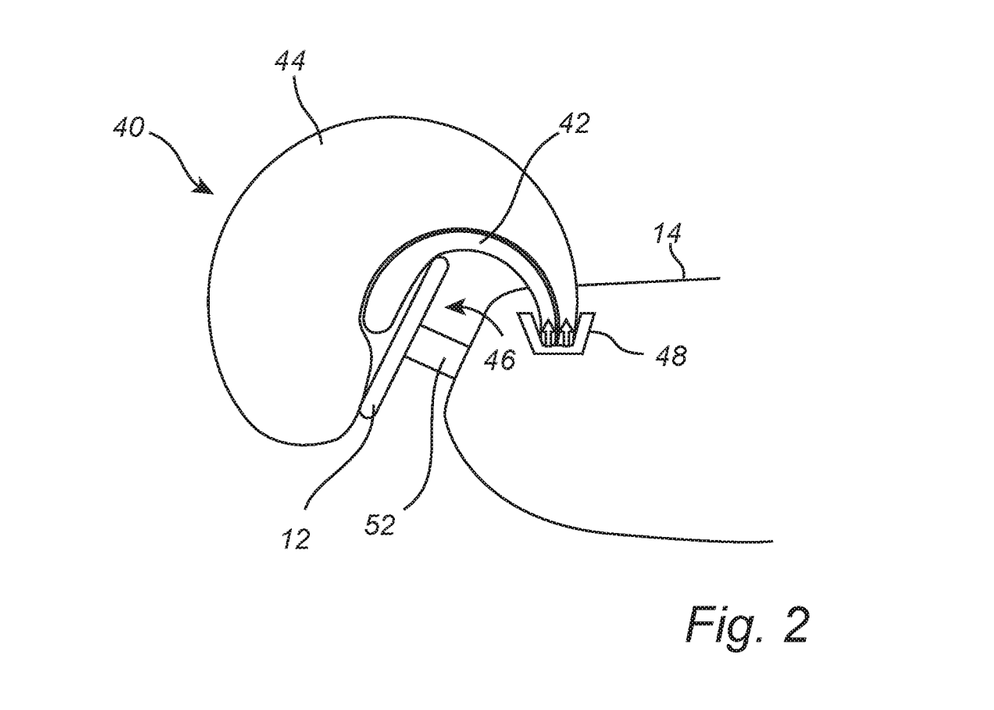
FIG. 2 is a schematic diagram illustrating a side view of a first airbag assembly for use with the dual-airbag system shown in FIG. 1, according to various embodiments of the present disclosure.

FIG. 2 is a side view showing a first embodiment of an airbag assembly 40 that may be part of the dual-airbag system 20 shown in FIG. 1. In this embodiment, the airbag assembly 40 may include a first airbag 42 and a second airbag 44. The second airbag 44 may be considered to be the primary airbag for providing protection for the driver, while the first airbag 42 may be considered to be an auxiliary airbag for supporting the primary airbag 44.

According to some embodiments, the airbag system 20 may be configured to deploy the first airbag 42 immediately before deploying the second airbag 44. Therefore, the first airbag 42 may be configured to provide a bridge over a gap 46 formed between the steering wheel 12 and the dashboard 14. This bridging effect is intended to prevent the second airbag 44 from getting caught up with the rim of the steering wheel 12, but instead will allow the primary airbag 44 to open in an unencumbered fashion to provide adequate cushioning for the person in the driver seat during a vehicle collision event.

The airbag assembly 40 may further include a storage module 48 configured to store the airbags 42, 44 within the dashboard 14 in a ready position before any accident is detected. When the collision detector 22 detects a collision that warrants the deployment of airbags, the airbags 42, 44 are deployed from the storage module 48, exiting the dashboard 14 to substantially assume the shapes and positions shown in FIG. 2. The dashboard 14 may include one or more panels or pieces (not shown) located above the storage module 48 that can easily break away when the airbags 42, 44 are inflating from the stored deflated condition to the fully inflated condition. During inflation, the first airbag 42 bridges the gap 46 and may overlap the rim of the steering wheel 12 to some extent to provide a clear path for the opening of the second airbag 44.

In some embodiments, the ignitors/inflators 26 may be configured to inflate the airbags 42, 44 using different amounts of pressure. For example, the first airbag 42 may be inflated with more pressure to provide a sturdy bridge over the gap 46, while the second airbag 44 may be inflated with less pressure to provide more cushioning effect for the body of the person 32 in the driver seat 16.

Figure 3A:
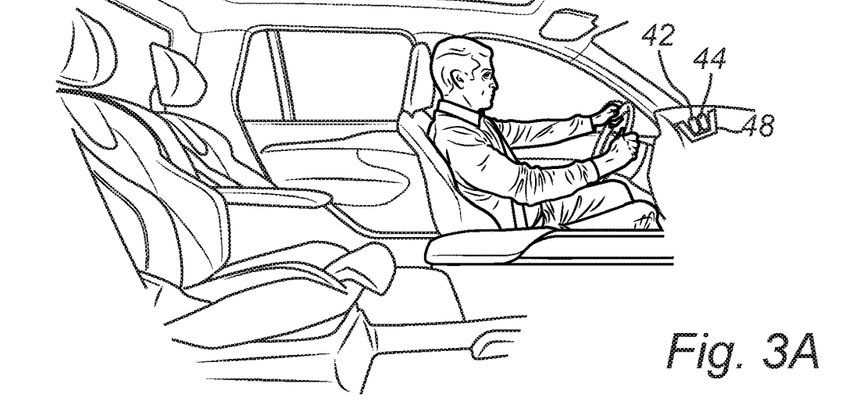
FIGS. 3A-3C are schematic diagrams illustrating side views of a deployment process for deploying the first airbag assembly of FIG. 2, according to various embodiments.
Figure 3B:
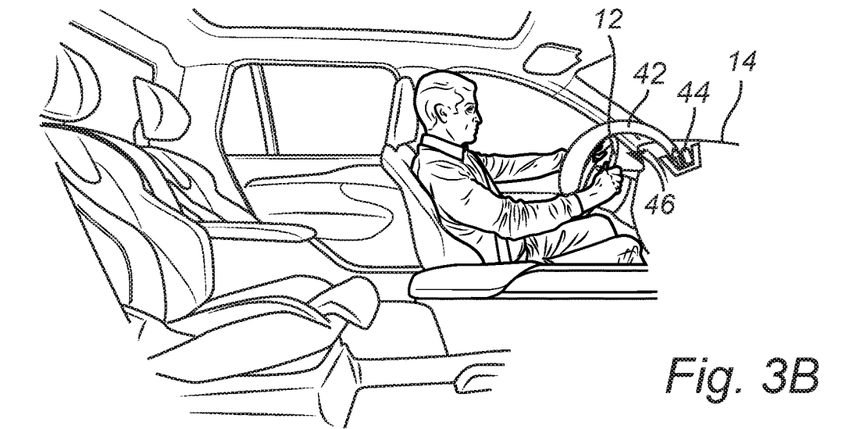
Figure 3C:
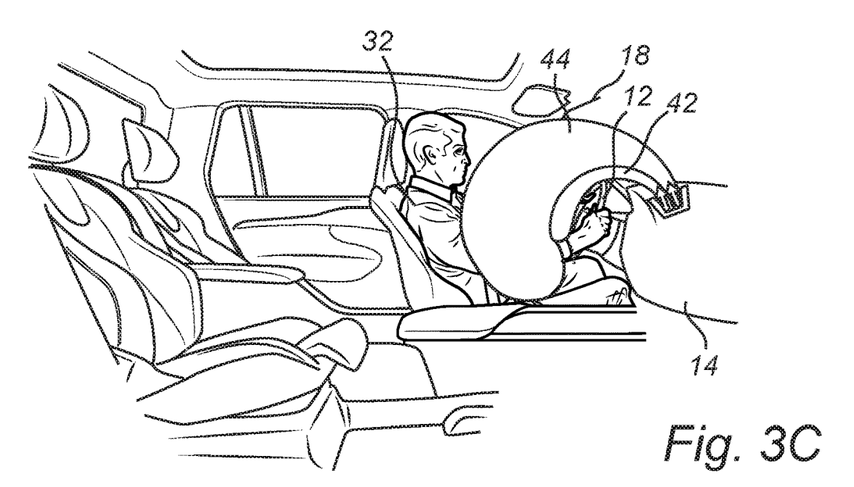

FIGS. 3A-3C are side views showing an example of a deployment process for deploying the airbags 42, 44 of the airbag assembly 40 of FIG. 2 when a collision event is detected. FIG. 3A shows the airbags 42, 44 within the storage module 48 immediately before a collision is detected. FIG. 3B shows the first airbag 42 in the process of being inflated during a first inflation stage. Again, the first airbag 42 bridges the gap 46 between the steering wheel 12 and the dashboard 14 to create an unobstructed path for the second airbag 44. During a second inflation stage, which may involve a second inflator, the second airbag 44 is inflated, as shown in FIG. 3C. The second airbag 44 may include a shape that allows it to fill the space between the person 32 involved in the accident and the steering wheel 12, dashboard 14, and windshield 18 to protect the person 32 during the accident.

Figure 4:
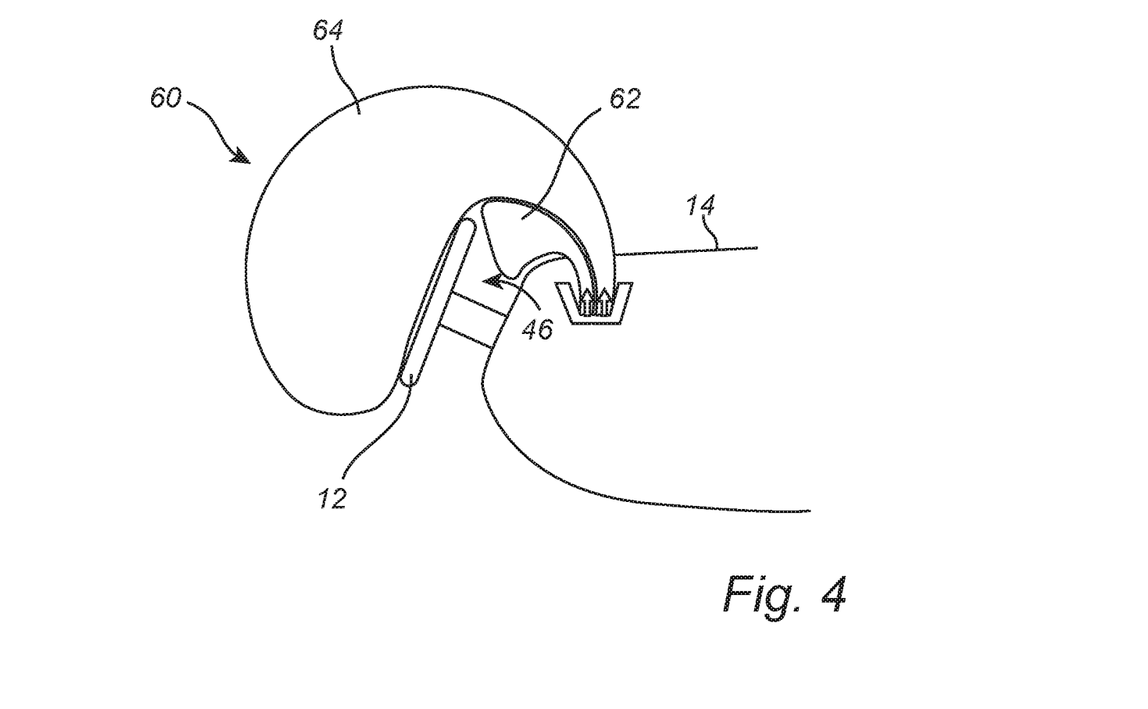
FIG. 4 is a schematic diagram illustrating a side view of a second airbag assembly for use with the dual-airbag system shown in FIG. 1, according to various embodiments.

FIG. 4 is a side view showing another embodiment of an airbag assembly 60 that may be used in the dual-airbag system 20 shown in FIG. 1. The airbag assembly 60 includes a first airbag 62 and a second airbag 64, similar in many ways to the airbag assembly 40 of FIG. 2. However, in this embodiment, the airbag assembly 60 is configured such that the first airbag 62, when deployed, is configured to form a wedge between the steering wheel 12 and the dashboard 14. Thus, the first airbag 62 at least partially fills the gap 46 between the steering wheel 12 and dashboard 14. The wedge may act in a similar manner to the bridge described above with respect to the airbag assembly 40 of FIG. 2. Particularly, the wedging effect of the first airbag 62 is configured to prevent the second airbag 64 from being hindered by the steering wheel 12 during the inflation process.

In alternative embodiments, the first airbag 42 shown in FIG. 2 and/or the first airbag 62 shown in FIG. 4 may be configured to both bridge the gap 46, 66 and wedge the gap 46, 66. In either case, the first airbags 42, 62 may be configured to provide a clear path for the inflation of the second airbags 44, 64.

Figure 5:
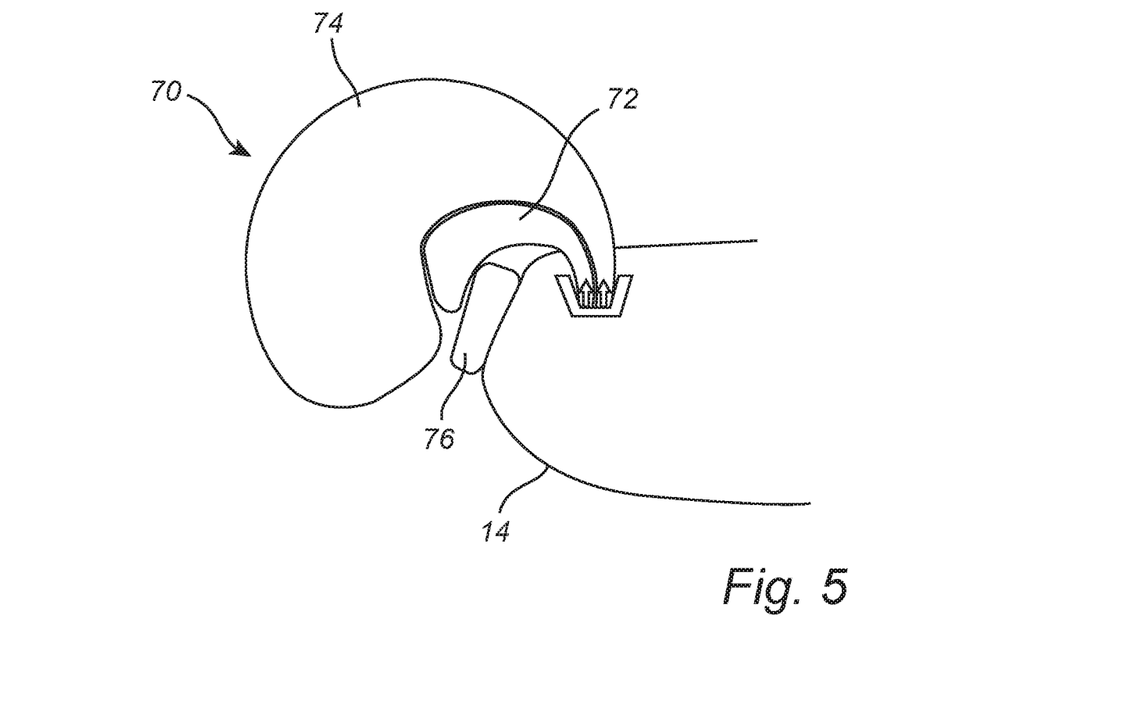
FIG. 5 is a schematic diagram illustrating a side view of another airbag system to be used in the vehicle of FIG. 1, according to various embodiments.

FIG. 5 is a side view showing another embodiment of another airbag system 70. Instead of using two airbags as mentioned with respect to the embodiment described above, the airbag system 70 of FIG. 5 includes at least three airbags. The airbag system 70 may also include many of the components (e.g., collision detector 22, microprocessor 24, and ignitors/inflators 26) of the airbag system 20 regarding the detection of a collision and control of the airbag inflation.

In this embodiment, the airbag system 70 may include a first airbag 72, a second airbag 74, and a third airbag 76. According to various embodiments, the first and second airbags 72, 74 may be similar to the first and second airbags 42, 44 of the airbag assembly 40 of FIG. 2 and/or may be similar to the first and second airbags 62, 64 of the airbag assembly 60 of FIG. 4. However, the third airbag 76 of the airbag system 70, which may also be incorporated into the embodiments of FIGS. 2 and 4, may further provide support for the first airbag 72 (or airbags 42, 62) when the steering wheel 12 is displaced from the normal manual-steering position depicted in FIGS. 2 and 4.

Therefore, when the vehicle is operated in an automated-steering mode and there is no steering wheel where one would normally be positioned, the airbag system 70 may be deployed in a slightly different manner to account for the absence of the steering wheel. Thus, the third airbag 76 may be deployed first to provide support for the first and second airbags 72, 74. Then the first airbag 72 can be deployed immediately thereafter as described before. However, instead of bridging or wedging a gap, the first airbag 72 is formed around or adjacent to the third airbag 76 (already inflated). The combination of the third and first airbags 76, 72, when inflated, provide a clear path for the opening of the second airbag 74, as mentioned above. In essence, the third airbag 76 takes the place of the steering wheel structure when the steering wheel 12 is stowed away or otherwise displaced from a normal manual-steering position.

Figure 6:
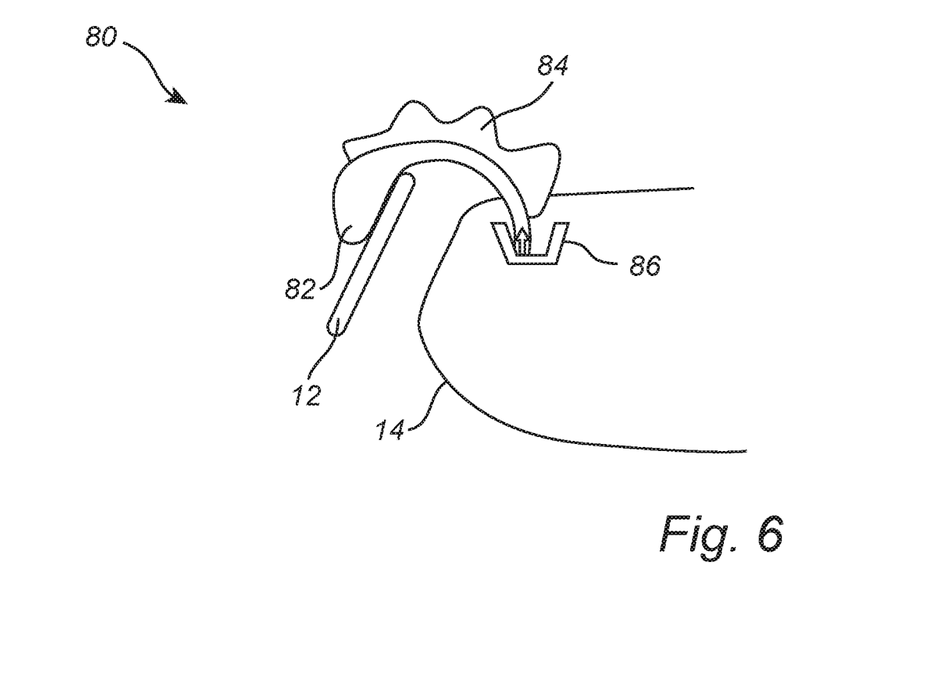
FIG. 6 is a schematic diagram illustrating a side view of exemplary features of the first airbag assembly of FIG. 2 and/or the second airbag assembly of FIG. 4 of the dual-airbag system shown in FIG. 1 and/or features of the airbag assembly of the second airbag system of FIG. 5, according to various embodiments.

FIG. 6 is a side view showing an embodiment of an airbag assembly 80 including features that may be incorporated into the first airbag assembly of FIG. 2 and/or the second airbag assembly of FIG. 4. The airbag assembly 80 may operate in the dual-airbag system 20 shown in FIG. 1 and/or in the airbag system 70 of FIG. 5. The airbag assembly 80 of FIG. 6 includes a first airbag 82, which may be similar to the first airbags 42, 62, 72 shown in the above-mentioned embodiments. Also, the airbag assembly 80 of FIG. 6 includes a second airbag 84, which may be similar to the second airbags 44, 64, 74 shown in the above-mentioned embodiments.

In this embodiment, however, the first and second airbags 82, 84 include outer surfaces where a portion of these outer surfaces are attached to each other. For example, the airbags 82, 84 may be sewn together, adhered together using an adhesive, or connected together by any other suitable means. FIG. 6 shows the first airbag 82 being inflated first, such as by a first inflator (not shown). Because the airbags 82, 84 are connected together, the inflation of the first airbag 82 causes the first airbag 82 to at least partially pull the second airbag 84 out of a storage module 86 in order that when the second airbag 84 is inflated immediately thereafter, the opening of the second airbag 84 can be unhindered by other obstacles (e.g., the steering wheel 12). When the two airbags 82, 84 are finally both inflated, the inflated airbag assembly 80 may have the same or similar appearance to the other airbag assemblies 40, 60, 70 shown in FIGS. 2, 4, and/or 5.

The embodiment of FIG. 6 may be configured such that the second airbag 84 is inflated by the same inflator used for initially inflating the first airbag 82. In other implementations, the second airbag 84 may be inflated by a second inflator, timed to begin inflating the second airbag 84 after the start (or completion) of the inflation of the first airbag 82. The second airbag 84 may begin inflation, at least partially, during the time that the first airbag 82 is pulling the second airbag 84 out of the storage module 86, which may allow the first airbag 82 to open properly without additional restraint from a deflated airbag.

Figure 7:
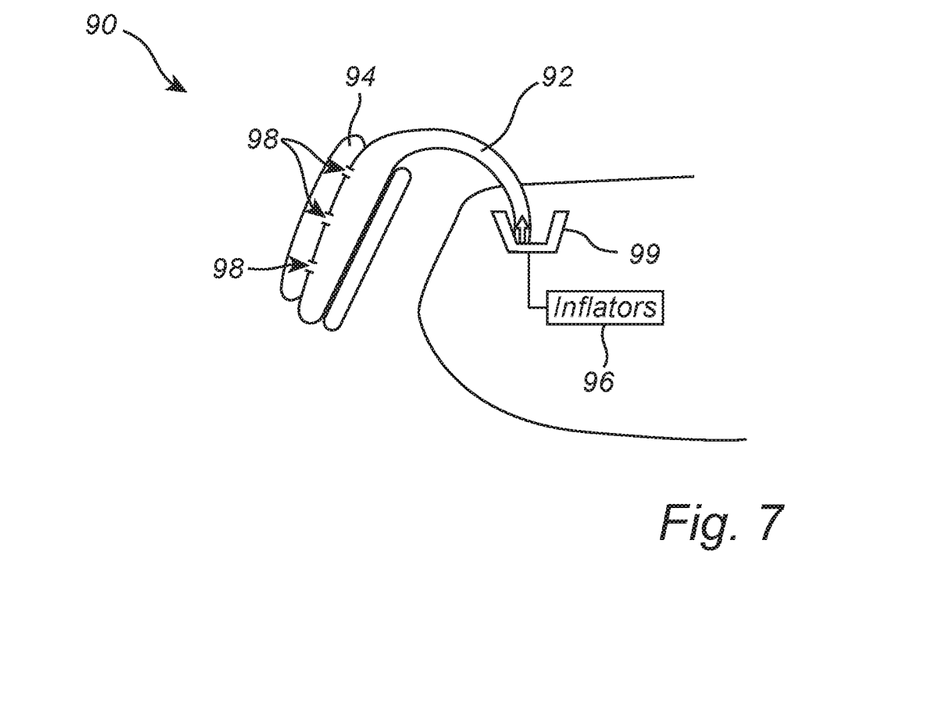
FIG. 7 is a schematic diagram illustrating a side view of additional exemplary features of the airbag assemblies of FIG. 6 during deployment, according to various embodiments.

FIG. 7 is a side view of another airbag assembly 90, which may include similar features to the airbag assembly 80 of FIG. 6, particularly the feature of first and second airbags being connected together. In this embodiment, the airbag assembly 90 may include a first airbag 92 and a second airbag 94. The airbag assembly 90 of FIG. 7 may include a single inflator 96 for inflating both airbags 92, 94. The inflator 96 may be connected directly to the first airbag 92 to allow the first airbag 92 to be inflated first. Also, at least one orifice 98 may be formed between the first and second airbags 92, 94 at one or more locations where the first and second airbags 92, 94 are connected together.

The airbag assembly 90 is shown in FIG. 7 during an inflation stage where the first airbag 92 is at least partially filled and the second airbag 94 begins inflation through the at least one orifice 98. The physical design of the airbags 92, 94 and the orifices 98 allow the sequential inflating of the two airbags 92, 94. As with the embodiment of FIG. 6, the first airbag 92 may be configured to pull the second airbag 94 out of a storage module 99 to position the second airbag 94 for inflation.

Figure 8:
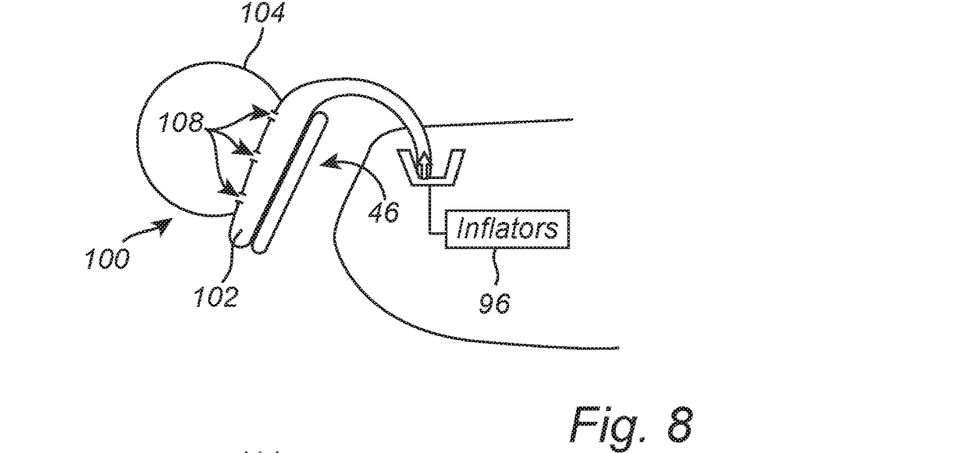
FIG. 8 is a schematic diagram illustrating a side view of a first implementation of additional exemplary features of the airbag assemblies of FIGS. 6 and 7, according to various embodiments.

FIG. 8 is a side view of an airbag assembly 100 according to a first embodiment of the airbag assembly 90 of FIG. 7. In this embodiment, first and second airbags 102, 104 are inflated by the single inflator 96. The first airbag 102 bridges over and/or wedges within the gap 46 and provides a launch platform for the second airbag 104. The second airbag 104 in this embodiment is a large bag, similar to a conventional airbag shape. The second airbag 104 is inflated by the ignitor or inflator 96 through at least one orifice 108 between the first and second airbags 102, 104, the first airbag 102 being in direct connection with the ignitor or inflator 96 and configured to at least partially inflate first, before the start of the inflation of the second airbag 104.

Figures 9, 10:
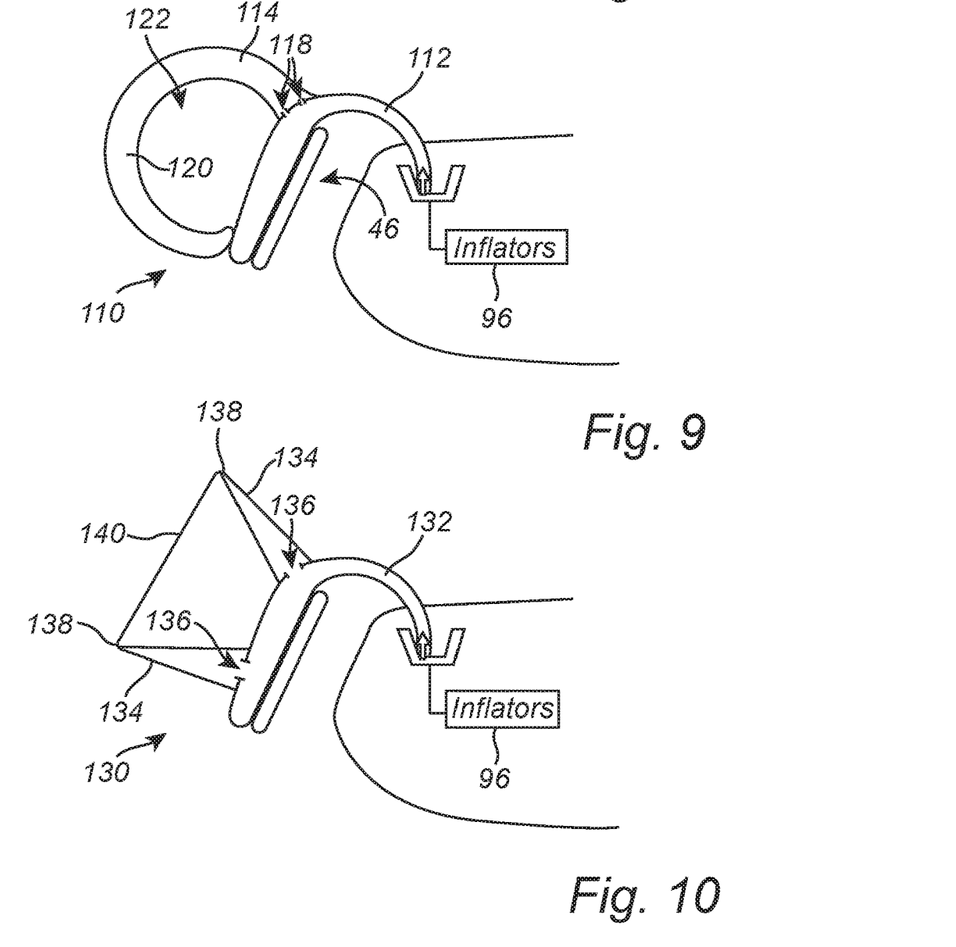
FIG. 9 is a schematic diagram illustrating a side view of a second implementation of additional exemplary features of the airbag assemblies of FIGS. 6 and 7, according to various embodiments.
FIG. 10 is a schematic diagram illustrating a side view of a second implementation of additional exemplary features of the airbag assemblies of FIGS. 6 and 7, according to various embodiments.

FIG. 9 is a side view of an airbag assembly 110 according to a second embodiment of the airbag assembly 90 of FIG. 7. In this embodiment, first and second airbags 112, 114 are also inflated by the single inflator 96. Again, the first airbag 112 bridges over and/or wedges within the gap 46 and provides a launch platform for the second airbag 114. According to the embodiment of FIG. 9, the second airbag 114 may be inflated via at least one orifice 118 between the first and second airbags 112, 114.

The second airbag 114, when inflated, may have a curved panel or roll-shaped configuration. For example, a surface of the second airbag 114 may include an inner portion 120 that is firm causing it to create an inner space 122 defined by the inner portion 120 when it is inflated. This configuration may allow the second airbag 114 to be completely inflated with less gas than a conventional pillow-shaped airbag.

FIG. 10 is a side view of an airbag assembly 130 according to a third embodiment of the airbag assembly 90 of FIG. 7. As mentioned above with respect to other similar embodiments, the two airbags 132, 134 are inflated using a single inflator (e.g., inflator 96). The first airbag 132 is connected directly to the inflator 96 and may be ignited first, bridging over and/or wedging within the gap. Orifices 136 between the first and second airbags 132, 134 allow gas to flow from the ignitor or inflator 96 through the first airbag 132 and into the second airbag 134. The second airbag 134 may be a cylindrical airbag or may include two or more projection airbag elements. Ends 138 of the one or more projections (or cylinder) 134 may be connected to a screen 140. The screen 140 may be a fabric material, netting, mesh, or other suitable material or components for providing a surface that can sufficiently protect the body and face of the person 32 in the event of an accident.

Therefore, the present disclosure provides several different embodiments of airbag systems, airbag assemblies, and a variety of ways to implement the airbags within the various airbag systems and assemblies. For example, in one embodiment, an airbag system (e.g., airbag system 20) may include an airbag assembly (e.g., airbag assembly 40, 60, 70, 80, 90) having a primary airbag (e.g., second airbag 44, 64, 74, 84, 94) installed in a dashboard (e.g., dashboard 14) of a vehicle (e.g., vehicle 10), where the primary airbag 44, 64, 74, 84, 94 is configured to be deployed when a collision event is detected. When deployed, the primary airbag 44, 64, 74, 84, 94 is configured to protect a person (e.g., person 32) seated in a driver seat (e.g., driver seat 16) of the vehicle 10. The airbag assembly 40, 60, 70, 80, 90 of the airbag system 20 further includes an auxiliary airbag (e.g., first airbag 42, 62, 72, 82, 92) configured to be deployed when the collision event is detected. During operation of the vehicle 10 in a manual-steering mode, the deployment of the auxiliary airbag 42, 62, 72, 82, 92 is configured to reduce contact between the primary airbag 44, 64, 74, 84, 94 and a steering wheel (e.g., steering wheel 12) of the vehicle 10 when the primary airbag 44, 64, 74, 84, 94 is deployed from the dashboard 14.

The airbag systems described above may further be configured such that reducing contact between the primary airbag 44, 64, 74, 84, 94 and the steering wheel 12 enables the primary airbag 44, 64, 74, 84, 94 to inflate with less obstruction from the steering wheel 12. When the auxiliary airbag 42, 62, 72, 82, 92 is deployed, the auxiliary airbag 42, 62, 72, 82, 92 may form a bridge over a gap (e.g., gap 46) between the steering wheel 12 and the dashboard 14. Alternatively, or additionally, when the auxiliary airbag 42, 62, 72, 82, 92 is deployed, the auxiliary airbag 42, 62, 72, 82, 92 may form a wedge that at least partially fills the gap 46 between the steering wheel 12 and the dashboard 14.

In one embodiment, the auxiliary airbag 42, 62, 72, 82, 92 may be installed in the dashboard 14 of the vehicle 10 adjacent to the primary airbag 44, 64, 74, 84, 94. Alternatively, the auxiliary airbag 42, 62, 72, 82, 92 may be installed in a steering column 19, 52 that connects the steering wheel 12 to the dashboard 14. When installed in the steering column 19, 52, the auxiliary airbag 42, 62, 72, 82, 92, when deployed, extends in a direction substantially perpendicular to an axis of the steering column 19, 52 to at least partially fill the gap 46 between the steering wheel 12 and the dashboard 14.

The present disclosure further provides airbag systems that further include a collision detection device (e.g., collision detector 22) configured to detect when the vehicle 10 experiences a collision event, such as a front-end collision. The collision detection device 22 may include an accelerometer, a pressure or force sensing device, or other suitable components for determining that the vehicle 10 is experiencing excessive forces that are indicative of an accident. The collision detection device 22 (or microprocessor 24 associated with the collision detector 22) may be configured to initiate deployment of the primary airbag 44, 64, 74, 84, 94 and auxiliary airbag 42, 62, 72, 82, 92 when the collision event is detected (e.g., via one or more ignitors or inflators). When the collision detection device 22 detects the collision event, the collision detection device 22 is configured to deploy the auxiliary airbag 42, 62, 72, 82, 92 before deploying the primary airbag 44, 64, 74, 84, 94.

The airbag systems of the present disclosure are further configured to include one or more inflation mechanisms (e.g., ignitors/inflators 26, inflators 96), wherein, when the collision event is detected, the one or more inflation mechanisms 26, 96 are configured to inflate the auxiliary airbag 42, 62, 72, 82, 92 with a higher pressure than a pressure used for inflating the primary airbag 44, 64, 74, 84, 94.

A portion of an outer surface of the auxiliary airbag 42, 62, 72, 82, 92 may be connected to a portion of an outer surface of the primary airbag 44, 64, 74, 84, 94. Furthermore, the airbag systems may further include at least one orifice (e.g., orifices 98, 108, 118, 136) arranged between an interior space of the auxiliary airbag 42, 62, 72, 82, 92 and an interior space of the primary airbag 44, 64, 74, 84, 94. Also, only one single inflator 96 may be used, where the single inflator 96 may be configured to inflate both the auxiliary airbag 42, 62, 72, 82, 92 and the primary airbag 44, 64, 74, 84, 94.

As illustrated in FIG. 5, the airbag systems of the present disclosure may be further configured to include a third airbag (e.g., third airbag 76). The third airbag 76 may be configured for deployment during operation of the vehicle 10 in an automated-steering mode when the steering wheel 12 is displaced from a normal operational space where the steering wheel 12 would occupy if arranged for operation in the manual-steering mode. Thus, when the collision event is detected, the third airbag 76 is configured such that when it is deployed, it is configured to at least partially fill the normal operational space.

According to some embodiments of the present disclosure, the airbag systems may further be configured such that the primary airbag (e.g., airbag 114), when deployed, includes a curved panel or roll shape, as shown in FIG. 9. Alternatively, the primary airbag (as shown in FIG. 10), when deployed, includes one or more inflatable projection elements (e.g., airbag(s) 134) and a screen (e.g., screen 140) attached to ends 138 of the one or more inflatable projection elements 134.

Figure 11:
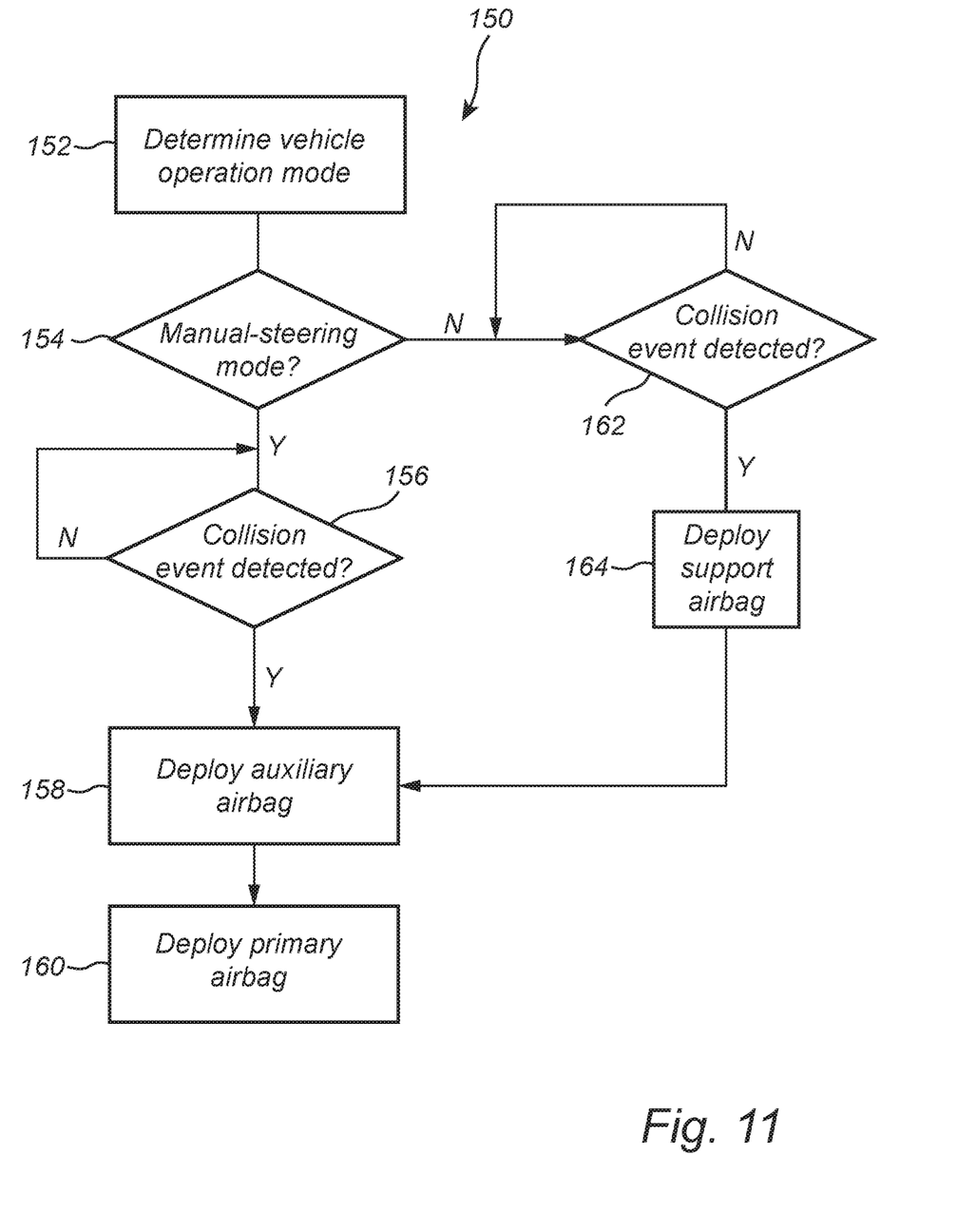
FIG. 11 is a block diagram illustrating a method for controlling an airbag system of a vehicle, according to various embodiments.

FIG. 11 is a block diagram illustrating an embodiment of a method 150 for controlling an airbag system of a vehicle. The method 150 comprising a step of determining a vehicle operation mode, as indicated in block 152, to determine if the vehicle is operating in a manual-steering mode or an automated-steering mode. If it is determined in decision diamond 154 that the vehicle is operating in a manual-steering mode, then the method 150 proceeds to decision diamond 156. If so, the method 150 includes detecting, as indicated in decision diamond 156, if the vehicle is experiencing a collision event. If not, the method returns to decision diamond 156 to repeatedly check to see if a collision is detected.

If a collision event is detected when the vehicle is operating in the manual-steering mode, the method 150 proceeds to block 158, which indicates that the method 150 includes deploying an auxiliary airbag (block 158) and deploying a primary airbag (block 160) from a dashboard of the vehicle to protect a person seated in a driver seat of the vehicle. Thus, before deploying the primary airbag (block 160), the method 150 includes deploying the auxiliary airbag (block 158) to reduce contact between the primary airbag and a steering wheel when the primary airbag is deployed from the dashboard. For example, the process of reducing contact between the primary airbag and the steering wheel includes forming the auxiliary airbag such that it blocks the obstruction potentially caused by the presence of the steering wheel to enable the primary airbag to inflate unhindered. The step of deploying the auxiliary airbag (block 158) may further include one or more of the steps of forming a bridge over a gap between the steering wheel and the dashboard and/or forming a wedge that at least partially fills the gap between the steering wheel and the dashboard.

The method 150 further includes an alternative process if it is determined in blocks 152 and 154 that the vehicle is operating in an automated-steering mode. In this case, the method 150 proceeds to decision diamond 162, which determines whether a collision event is detected, similar to the decision block 156. If no collision is detected, the method 150 returns to decision diamond 162 until (if ever) a collision event has occurred. If a collision event is detected when the vehicle is operating in the automated-steering mode and the steering wheel is displaced from a normal operational space where the steering wheel would occupy if arranged for operation in the manual-steering mode, the method 150 proceeds to block 164, which indicates that the process includes deploying a third airbag (e.g., support airbag), as indicated in block 164, to at least partially fill the normal operational space. After this support airbag is deployed, the method proceeds to blocks 158 and 160, which includes the steps of deploying the auxiliary airbag and primary airbag, as mentioned above.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random-access memory (RAM), read-only memory (ROM), electrically erasable-programmable read-only memory (EEPROM), compact disc read-only memory (CD-ROM) or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared (IR), radio frequency (RF), and microwave, then the coaxial cable, fiber optic cable, twisted pair, DSL, or wireless technologies, such as IR, RF, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Although the present invention is illustrated and described herein with reference to preferred embodiments and specific examples thereof, it will be readily apparent to those of ordinary skill in the art that other similar embodiments and examples can perform similar functions and/or achieve like results. All such equivalent or similar embodiments and examples should be considered as being within the spirit and scope of the present invention, are contemplated thereby, and are intended to be covered by the following non-limiting claims.

What is claimed is:

1. An airbag system housing both a primary airbag and an auxiliary airbag configured to be installed in a dashboard of a vehicle, wherein the auxiliary airbag is disposed and dimensioned relative to the primary airbag such that when both are deployed during a collision event subsequent to a determination that the vehicle is operating in a manual-steering mode with a steering wheel present adjacent to the primary airbag and the auxiliary airbag the auxiliary airbag functions to reduce contact area between the primary airbag and the steering wheel upon impact by a person seated in a driver seat of the vehicle, wherein when the auxiliary airbag is deployed the auxiliary airbag forms a bridge spanning a gap between the steering wheel and the dashboard over which the primary airbag is deployed from the dashboard.

2. The airbag system of claim 1, wherein reducing the contact area between the primary airbag and the steering wheel enables the primary airbag to inflate with less obstruction from the steering wheel.

3. The airbag system of claim 1, wherein, when the auxiliary airbag is deployed, the auxiliary airbag forms a wedge that at least partially fills a gap between the steering wheel and the dashboard.

4. The airbag system of claim 1, wherein the auxiliary airbag is installed in the dashboard of the vehicle adjacent to the primary airbag.

5. The airbag system of claim 1, wherein the auxiliary airbag, when deployed, extends in a direction substantially perpendicular to an axis of the steering column to at least partially fill a gap between the steering wheel and the dashboard.

6. The airbag system of claim 1, further comprising a collision detection device configured to detect when the vehicle experiences the collision event, wherein the collision detection device is configured to initiate deployment of the primary airbag and the auxiliary airbag when the collision event is detected.

7. The airbag system of claim 6, wherein, when the collision detection device detects the collision event, the collision detection device is configured to deploy the auxiliary airbag before deploying the primary airbag.

8. The airbag system of claim 1, further comprising one or more inflation mechanisms, wherein, when the collision event is detected, the one or more inflation mechanisms are configured to inflate the auxiliary airbag with a higher pressure than a pressure used for inflating the primary airbag.

9. The airbag system of claim 1, wherein a portion of an outer surface of the auxiliary airbag is connected to a portion of an outer surface of the primary airbag.

10. The airbag system of claim 9, further comprising:
at least one orifice arranged between an interior space of the auxiliary airbag and an interior space of the primary airbag; and an inflator configured to inflate both the auxiliary airbag and the primary airbag.

11. The airbag system of claim 1, further comprising a third airbag configured for deployment during operation of the vehicle in an automated-steering mode when the steering wheel is displaced from a normal operational space where the steering wheel would occupy if arranged for operation in a manual-steering mode, wherein, when the collision event is detected, the third airbag, when deployed, is configured to at least partially fill the normal operational space.

12. The airbag system of claim 1, wherein the primary airbag, when deployed, includes a curved panel.

13. The airbag system of claim 1, wherein the primary airbag, when deployed, includes one or more inflatable projection elements and a screen attached to ends of the one or more inflatable projection elements.

14. A method of deploying airbags from an airbag system that houses both a primary airbag and an auxiliary airbag and configured to be installed in a dashboard of a vehicle, the method comprising detecting a collision event and deploying during the collision event both the primary airbag and the auxiliary airbag, where the auxiliary airbag is disposed and dimensioned relative to the primary airbag such that when both are deployed during the collision event subsequent to a determination that the vehicle is operating in a manual-steering mode with a steering wheel present adjacent to the primary airbag and the auxiliary airbag the auxiliary airbag functions to reduce contact area between the primary airbag and the steering wheel upon impact by a person seated in a driver seat of the vehicle, wherein when the auxiliary airbag is deployed the auxiliary airbag forms a bridge spanning a gap between the steering wheel and the dashboard over which the primary airbag is deployed from the dashboard.

15. The method of claim 14, wherein reducing the contact area between the primary airbag and the steering wheel enables the primary airbag to inflate with less obstruction from the steering wheel.

16. The method of claim 14, wherein forming the bridge spanning the gap between the steering wheel and the dashboard with the auxiliary airbag comprises forming a wedge that at least partially fills the gap between the steering wheel and the dashboard with the auxiliary airbag.

17. The method of claim 14, wherein if the collision event is detected when the vehicle is operating in the automated-steering mode and the steering wheel is displaced from a normal operational space that the steering wheel would occupy if arranged for operation in a manual-steering mode, the method further includes deploying a third airbag to at least partially fill the normal operational space.

18. A non-transitory computer-readable medium stored in a memory and executed by a processor for deploying airbags from an airbag system that houses both a primary airbag and an auxiliary airbag and configured to be installed in a dashboard of a vehicle by executing the steps including detecting a collision event and deploying during the collision event both the primary airbag and the auxiliary airbag, where the auxiliary airbag is disposed and dimensioned relative to the primary airbag such that when both are deployed during the collision event subsequent to a determination that the vehicle is operating in a manual-steering mode with a steering wheel present adjacent to the primary airbag and the auxiliary airbag the auxiliary airbag functions to reduce contact area between the primary airbag and the steering wheel upon impact by a person seated in a driver seat of the vehicle, wherein when the auxiliary airbag is deployed the auxiliary airbag forms a bridge spanning a gap between the steering wheel and the dashboard over which the primary airbag is deployed from the dashboard.

* * * * *